United States Patent Office 2,966,478
Patented Dec. 27, 1960

2,966,478

DIIMIDAZOLINE FROM $C_{19}$ DIBASIC ACID

Stuart A. Harrison, Minneapolis, Minn., assignor to General Mills, Inc., a corporation of Delaware No Drawing. Filed Apr. 29, 1957, Ser. No. 655,481

2 Claims. (Cl. 260—47)

This invention relates to novel bis-imidazolines derived from $C_{19}$ aliphatic dicarboxylic acids and their use as co-reactants with epoxy resins.

Various co-reactants with epoxy resins are now commercially available. Each of these has certain advantages and disadvantages and their applications are limited accordingly. The diimidazoline co-reactants taught by this invention have many advantages and improvements not heretofore obtainable with known co-reactants. Among these advantages are non-volatility, low viscosity, and low toxicity.

High heat distortion temperatures are an especially important physical characteristic of the final resin obtained by the practice of this invention.

Other advantages to these co-reactants will become apparent upon reading the subsequent specification.

Basically the compositions of this invention are bis-imidazolines of the general structural formula, $$X-CH-Y-C\begin{smallmatrix}N-CH_2\\ \\N-CH_2\end{smallmatrix}N-CH_2$$

$$\begin{smallmatrix}|\\C\\ \end{smallmatrix}$$

$$N-CH_2 \quad (CH_2CH_2NH)_{k-1}H$$

$$(CH_2CH_2NH)_{k-1}H$$

where X is a straight chained hydrocarbyl radical, Y is a straight chained hydrocarbylene radical, k is an integer less than 6, and the number of carbon atoms in X and Y totals 16.

These compounds may be prepared by reacting acids of the general formula $$X-CH-Y-COOH$$
$$|$$
$$COOH$$

with various polyamines. Similarly, the esters of these acids may be utilized as a starting material.

The dicarboxylic acid is in turn prepared by the addition of carbon monoxide and water to an unsaturated acid, preferably oleic acid. Their preparation is shown in Reppe and Kroper, Ann 582, 63–65 (1953), and the reaction involved is illustrated graphically below:

$$\begin{matrix}H & H\\ C=C+CO+H_2O\end{matrix}\xrightarrow{(catalyst)}\begin{matrix}H & H\\ -C-C-\\ | & |\\ H & C=O\\ & |\\ & O\\ & |\\ & H\end{matrix}$$

where $$\begin{matrix}H & H\\ -C=C-\end{matrix}$$

represents the ethylene unsaturation of the fatty acid molecule.

An alternative method is to react the carbon monoxide and unsaturated fatty acid in the presence of hydrogen to get the aldehyde or alcohol or mixtures thereof which are then oxidized to the acid as shown below:

$$(a)\begin{matrix}H & H\\ -C-C-\\ | & |\\ H & C=O\\ & |\\ & H\end{matrix}\xrightarrow{oxidation}\begin{matrix}H & H\\ -C-C-\\ | & |\\ H & C=O\\ & |\\ & OH\end{matrix}$$

$$\begin{matrix}H & H\\ -C=C-\end{matrix}+CO+H_2\xrightarrow{cobalt\ catalyst}+$$

$$(b)\begin{matrix}H & H\\ -C-C-\\ | & |\\ H & COH\\ & |\\ & H_2\end{matrix}\xrightarrow{oxidation}\begin{matrix}H & H\\ -C-C-\\ | & |\\ H & C=O\\ & |\\ & OH\end{matrix}$$

In addition to oleic acid it is also envisioned that other $C_{18}$ unsaturated fatty acids such as linoleic, linolenic, ricinoleic, and elaidic or mixtures thereof may be employed.

Suitable polyamines which may be employed in this invention have the following structural formula $$H_2N(CR_2CR_2NH)_kH$$

where R is hydrogen or a lower alkyl group and k is an integer less than 6. Illustrative polyamines are ethylenediamine, diethylene triamine, triethylenetetramine, tetraethylenepentamine, di-1,2-propanetriamine and the like.

The epoxy resins employed as co-reactants are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee Patents 2,585,115 and 2,589,245. Several of these resins are readily available commercial products.

Typical polyhydric phenols useful in the preparation of epoxy resins include resorcinal and various bisphenols resulting from the condensation of phenol with aldehydes and ketones such as formaldehyde, acetaldehyde, acetone, methyl ethyl ketone, and the like. A typical epoxy resin is the reaction product of epichlorohydrin and 2,2-bis(p-hydroxy phenyl)propane(Bisphenol A), the resin having the following theoretical structural formula, $$CH_2\overset{O}{\diagdown}CH-CH_2-O-\left(\bigcirc-\underset{CH_3}{\overset{CH_3}{\underset{|}{C}}}-\bigcirc-O-CH_2-\overset{OH}{\underset{|}{C}H}-CH_2-O-\right)_n\bigcirc-\underset{CH_3}{\overset{CH_3}{\underset{|}{C}}}-\bigcirc-O-CH_2\overset{O}{\overset{}{CH}}CH_2$$

where n is 0 or an integer up to 10. Generally speaking, n will be no greater than 2 or 3 and is preferably 1 or less.

Epoxy resins may be characterized further by reference to their epoxy equivalent weight, the epoxy equivalent weight of pure epoxy resins being the mean molecular weight of the resin divided by the mean number of epoxy radicals per molecule, or in any case the number of grams of epoxy resin equivalent to one mole of the epoxy group or one gram equivalent of epoxide. Epoxy resins having an epoxy equivalent weight of 100 to 300 are suitable for use in this invention, the preferred range being 100 to 200.

This invention may be illustrated further by reference to the following examples in which all "parts" are expressed as parts by weight and all "percentages" are expressed as percent by weight, unless specified otherwise.

EXAMPLE I

Fatty acids from tall oil, about 50% each of oleic and linoleic acids, were mixed with cobalt sulfate as a catalyst for their oxonation. The oxonation was then carried out by reacting carbon monoxide and hydrogen (1:1.2 ratio) with these acids in a closed reaction vessel maintained at a pressure of about 200 atmospheres. The cobalt catalyst was removed from the reaction mixture by treating it with steam and a small amount of hydrogen and filtration. The oxonation product containing alcohols and aldehydes was oxidized to $C_{19}$ dibasic acid by alkali fusion in a copper-lined reaction vessel at about 200° C. The resulting product contained about 70% dibasic acid.

200 grams of tetraethylene pentamine and 200 grams of the above reaction product were reacted together according to the schedule shown below in a one liter flask attached to an 8 inch Vigreaux type column with take off and downward condenser for removal of water and other volatile materials from the reaction mixture:

| Reaction Time In Minutes | Vapor Temp., °C. | Pot Temp., °C. | cc. of Distillate Collected |
|---|---|---|---|
| 0 | 25 | 25 | |
| 15 | 25 | 115 | |
| 33 | 98 | 150 | |
| 70 | 99 | 170 | 12 |
| 100 | 99 | 200 | 22.5 |
| 120 | 101 | 230 | 28 |
| 147 | 95 | 248 | 33 |
| 175 | 99 | 275 | 37 |
| 190 | 75 | 275 | 38 |
| 220 | 98 | 295 | 41 |

The product was an amber viscous liquid at room temperature and analyzed as follows:

Acid No. _____ 1.8
Amine No. _____ 493
Gardner viscosity _____ Z–6+

When mixed an epoxy resin derived from Bis-phenol A and epichlorohydrin having an epoxy equivalent weight of about 180 in the proportions shown and cured for one hour at 150° C., the following results were obtained:

| Ratio Epoxy Resin to Imidazoline | Barcol Hardness | Heat Dist. Temperature, °C. | Ultimate Flexural Strength, p.s.i. |
|---|---|---|---|
| 85/15 | 67–70 | 63 | 8,200 |
| 80/20 | 70–73 | 106 | 8,500 |

EXAMPLE II 178 grams of the dimethyl ester obtained by esterifying a $C_{19}$ dicarboxylic acid prepared as shown in Example I and 300 grams of diethylene triamine were reacted in a flask having an attached short air cooled reflux column and a downward condenser. The reaction mixture was stirred throughout, and the schedule of the reaction temperature and time was as follows:

| Reaction Time in Minutes | Temperature, °C. | Volatile Materials Collected, cc. |
|---|---|---|
| 0 | 140 | 0. |
| 19 | 163 | 7. |
| 137 | 176 | 22. |
| 172 | 192 | 29. |
| 202 | 201 | 32. |
| 227 | 208 | 37.[1] |
| 277 | 214 | 70. |
| 315 | 222 | 135. |
| 344 | 232 | 174. |
| 407 | 281 | 240. |
| 422 | 299 | 245 [2] =239 g. |

[1] Largely methanol.
[2] Contained some polyamine.

The reaction product was then stripped to remove all unreacted polyamine. After stripping, the reaction product (over 80% diimidazoline) weighed 232.5 gm., had an amine number of 443 (i.e., number of milligrams of KOH equivalent to the free amine groups in a one gram sample of the resin), and contained 16.9% nitrogen.

The resulting diimidazoline was reacted with two different epoxy resins as shown in Table I.

Table I

| Parts by Weight | | | Barcol Hardness | HDT, °C. | Flexural Strength, p.s.i. |
|---|---|---|---|---|---|
| Diimidazoline | Epoxy Resin 1[1] | Epoxy Resin 2[2] | | | |
| 15 | 85 | ------ | 74 | 110 | 9,600 |
| 20 | 80 | ------ | 76 | 105 | 9,100 |
| 20 | ------ | 80 | 76 | 735 | 17,300 |

[1] A reaction product of Bisphenol A and epichlorohydrin having an epoxy equivalent weight of about 190.
[2] A modified reaction product of Bisphenol A and epichlorohydrin having an epoxy equivalent weight of about 185.

The preferred compositions of this invention are those which contain 10 to 30 percent by weight diimidazoline based on the combined weight of epoxy resin and diimidazoline.

Therefore, many modifications and variations of the invention as hereinbefore set forth may be made without departing from the spirit and scope thereof, and therefore only such limitations should be imposed as are indicated in the appended claims.

I claim as my invention:

1. Composition of matter containing an epoxy resin of a polyhydric phenol and a halohydrin selected from the group consisting of epichlorohydrin and glycerol dichlorohydrin having an epoxy equivalent weight of at least 100 and a diimidazoline of the general structural formula,

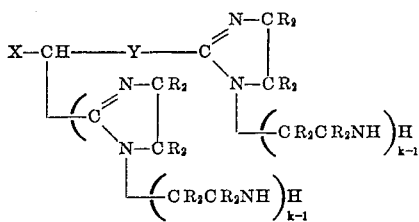

where X is a straight chained aliphatic hydrocarbon radical, Y is a straight chained aliphatic hydrocarbon radical, $k$ is an integer from 1 to 5, R is selected from the group consisting of hydrogen and a methyl radical and the sum of carbon atoms in X and Y totals 16.

2. Composition of matter containing an epoxy resin of 2,2-bis(p-hydroxy phenyl) propane and epichlorohydrin and having an epoxy equivalent weight in the range of 100 to 300 and a diimidazoline prepared from a polyamine of the general structural formula $$H_2N(CH_2CH_2NH)_kH$$

where $k$ is an integer from 1 to 5 and a dibasic acid prepared by oxonating unsaturated $C_{18}$ fatty acids.

References Cited in the file of this patent
UNITED STATES PATENTS

| | | |
|---|---|---|
| 2,374,354 | Kaplan | Apr. 24, 1945 |
| 2,615,008 | Greenlee | Oct. 21, 1952 |
| 2,668,807 | Greenlee | Feb. 9, 1954 |
| 2,707,708 | Wittcoff | May 3, 1955 |
| 2,771,445 | De Groote et al. | Nov. 20, 1956 |
| 2,820,043 | Rainey et al. | Jan. 14, 1958 |

UNITED STATES PATENT OFFICE
CERTIFICATION OF CORRECTION

Patent No. 2,966,478

December 27, 1960

Stuart A. Harrison

It is hereby certified that error appears in the above numbered patent requiring correction and that the said Letters Patent should read as corrected below.

Column 3, line 31, after "mixed" insert -- with --; column 4, Table I, fourth column thereof, third item, for "76" read -- 72 --; same Table I, fifth column thereof, third item, for "735" read -- 73.5 --.

Signed and sealed this 22nd day of August 1961.

(SEAL)
Attest:

ERNEST W. SWIDER
Attesting Officer

DAVID L. LADD
Commissioner of Patents